(12) United States Patent
Schwartz

(10) Patent No.: US 9,378,610 B2
(45) Date of Patent: Jun. 28, 2016

(54) SYSTEM AND METHOD FOR USING SCRIP IN A GAMING ENVIRONMENT

(75) Inventor: Andrew J. Schwartz, Chester Springs, PA (US)

(73) Assignee: Global Payments Gaming Services, Inc., Las Vegas, NV (US)

( * ) Notice: Subject to any disclaimer, the term of this patent is extended or adjusted under 35 U.S.C. 154(b) by 932 days.

(21) Appl. No.: 13/521,759

(22) PCT Filed: Jan. 14, 2011

(86) PCT No.: PCT/US2011/021354
§ 371 (c)(1),
(2), (4) Date: Jul. 12, 2012

(87) PCT Pub. No.: WO2011/088360
PCT Pub. Date: Jul. 21, 2011

(65) Prior Publication Data
US 2012/0295682 A1 Nov. 22, 2012

Related U.S. Application Data

(60) Provisional application No. 61/295,033, filed on Jan. 14, 2010.

(51) Int. Cl.
*A63F 9/24* (2006.01)
*A63F 13/00* (2014.01)
*G06F 17/00* (2006.01)
*G06F 19/00* (2011.01)
*G07F 17/32* (2006.01)
*G06Q 20/06* (2012.01)
(Continued)

(52) U.S. Cl.
CPC ............... *G07F 17/32* (2013.01); *G06Q 20/06* (2013.01); *G07F 17/3241* (2013.01); *G07F 17/3248* (2013.01); *G07F 17/3251* (2013.01); *G07F 17/42* (2013.01); *G07F 19/20* (2013.01); *G07F 19/203* (2013.01)

(58) Field of Classification Search
CPC ..... G07F 17/3248; G07F 17/42; G07F 17/32; G07F 17/3241; G07F 17/3251; G07F 19/20; G07F 19/203; G06Q 20/06
USPC ..................................................... 463/20, 25
See application file for complete search history.

(56) References Cited

U.S. PATENT DOCUMENTS 5,290,033 A   3/1994   Bittner et al.
6,098,837 A   8/2000   Izawa et al.
(Continued)

OTHER PUBLICATIONS

PCT International Search Report and the Written Opinion of the International Search Authority for International Application No. PCT/US2011/021354 dated Apr. 6, 2011, 11 pages.

*Primary Examiner* — Omkar Deodhar
*Assistant Examiner* — Wei Lee
(74) *Attorney, Agent, or Firm* — Mendelsohn Dunleavy, P.C.; Steve Mendelsohn

(57) ABSTRACT

The present disclosure describes exemplary systems and methods for using gaming scrips in a gaming environment. The gaming scrips have pre-printed face values and machine-readable unique identifiers located thereon, and are loaded into any of various currency-handling devices. The gaming scrips may be activated either before being loaded into a currency-handling device or at the time of dispensing therefrom. Once validated in the gaming environment, the gaming scrips may be collected, sorted, reactivated, and reused in the gaming environment.

29 Claims, 7 Drawing Sheets

(51) Int. Cl.
*G07F 17/42* (2006.01)
*G07F 19/00* (2006.01)

(56) References Cited

U.S. PATENT DOCUMENTS

| | | |
|---|---|---|
| 6,170,744 B1 | 1/2001 | Lee et al. |
| 2003/0038176 A1 | 2/2003 | Dabrowski |
| 2003/0197327 A1 | 10/2003 | Mitchell, Jr. |
| 2004/0206601 A1 | 10/2004 | Heidel |
| 2005/0003889 A1 | 1/2005 | Dabrowski |
| 2005/0096126 A1 | 5/2005 | Prasad et al. |
| 2007/0181676 A1* | 8/2007 | Mateen et al. ............ 235/381 |

* cited by examiner

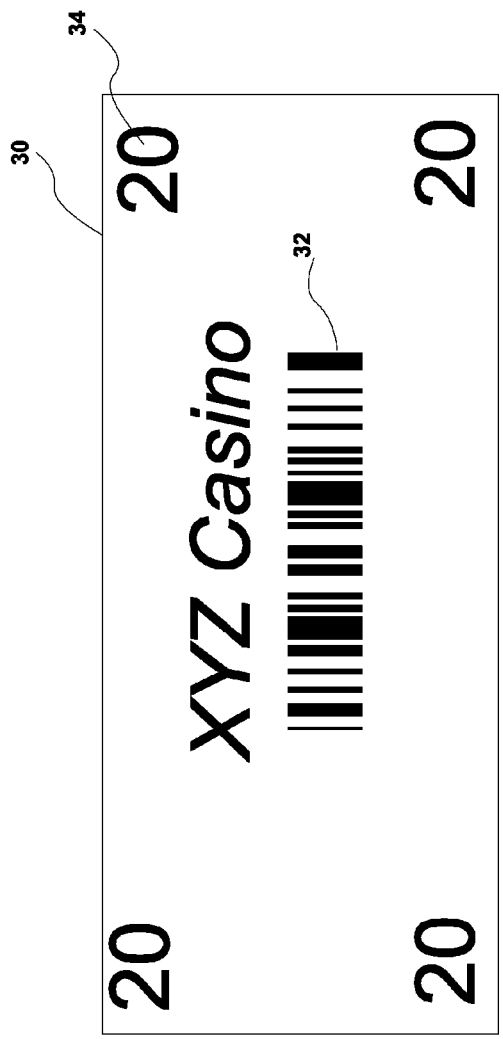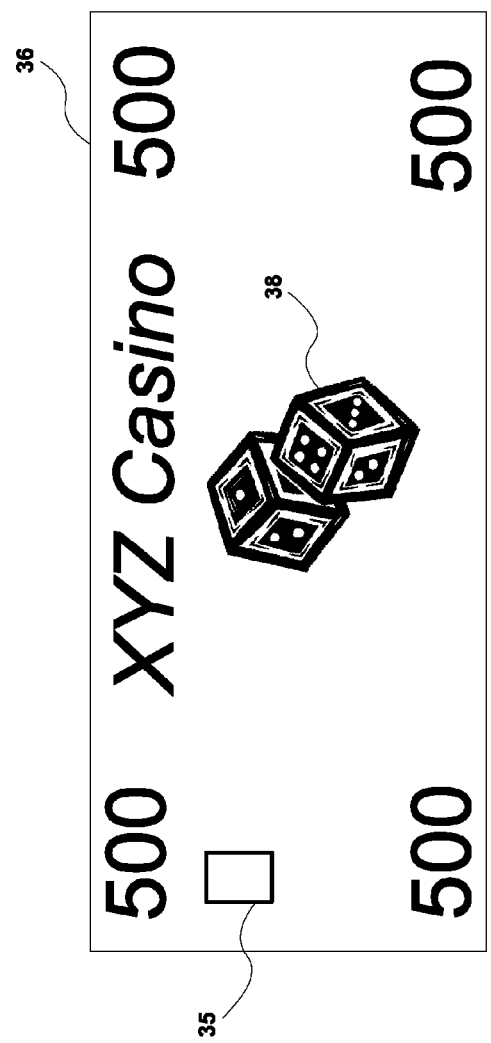

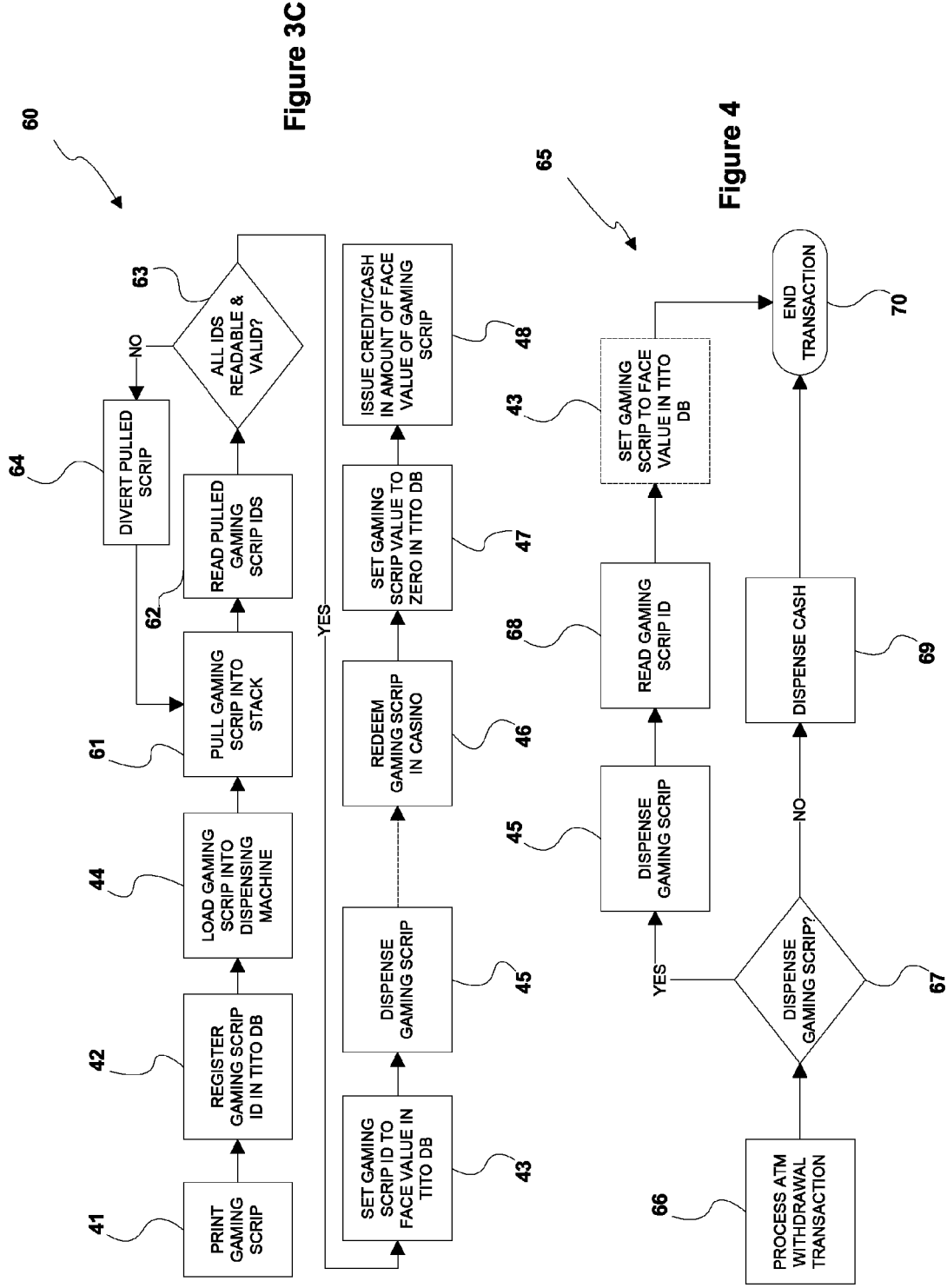

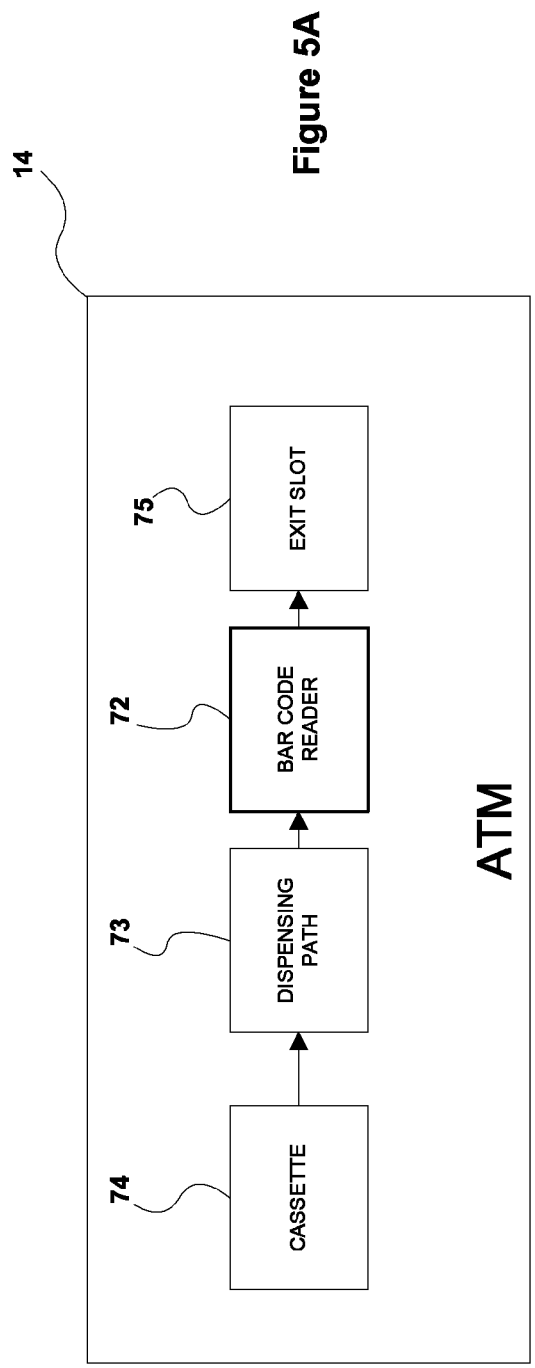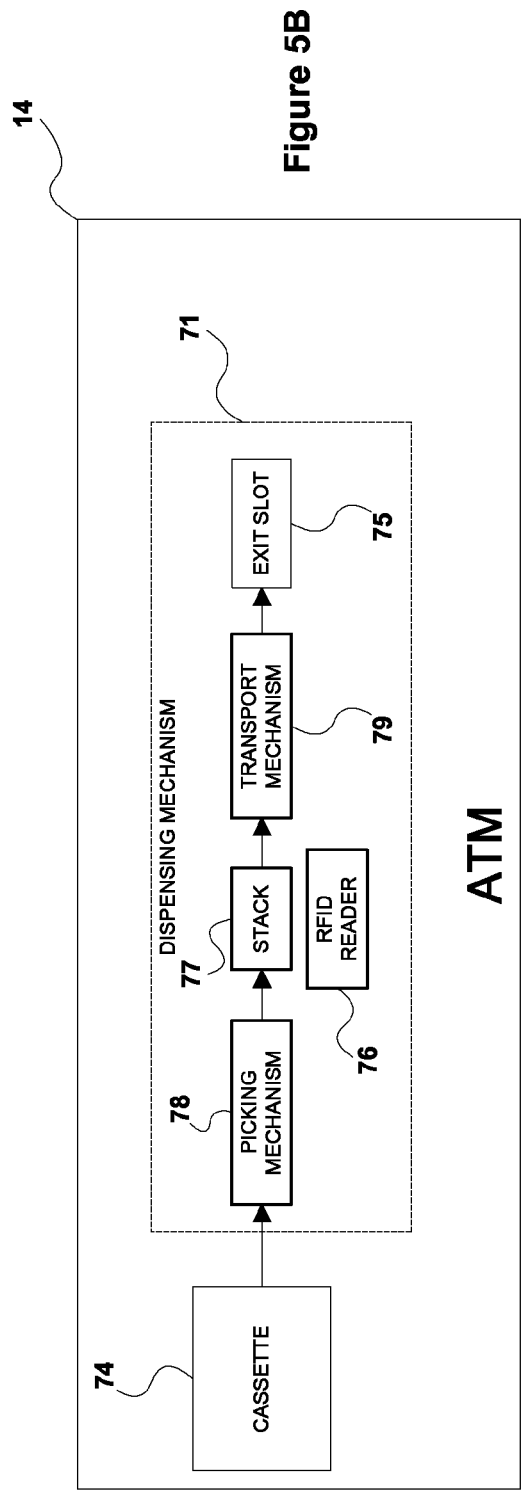

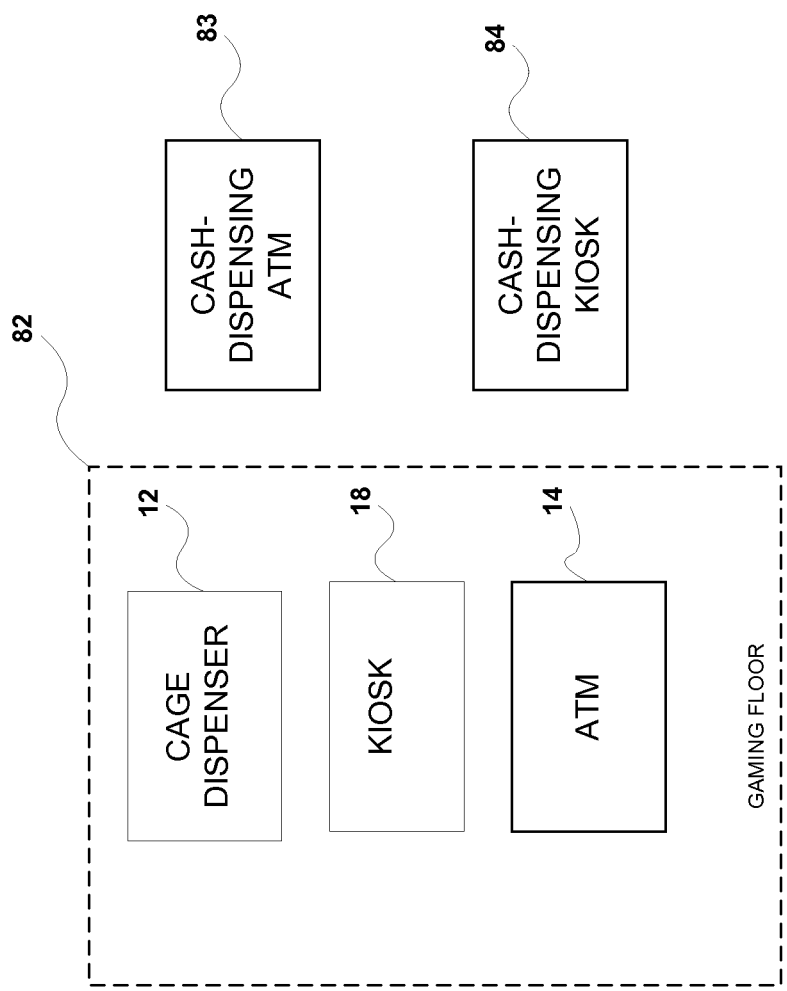

SYSTEM AND METHOD FOR USING SCRIP IN A GAMING ENVIRONMENT

BACKGROUND AND FIELD OF INVENTION

The present invention relates generally to casino gaming, and more specifically, to a system and method for handling scrip in a gaming environment.

In a gaming establishment, it is ordinarily necessary for significant amounts of cash to be placed in circulation in order to support the use of currency-handling devices, such as automated teller machines (hereinafter "ATMs"), kiosks and cage cash dispensers on the gaming floor. Such currency-handling devices are desirable because they enable customers to execute financial transactions on the gaming floor for the purpose of obtaining cash to be used for gaming. The cash necessary to support the use of such currency-handling devices significantly increases the working capital necessary to operate the gaming establishment.

In recent years, gaming vouchers have become widely used as a cash-equivalent within a specific gaming establishment. Accordingly, there have been efforts to use gaming vouchers instead of cash for many types of currency-handling device transactions. The use of gaming vouchers as substitute for cash in currency-handling devices has several drawbacks. Because gaming vouchers do not have a fixed face value, they must be printed at the time of dispensing. The printing step slows the dispensing process and requires relatively complex modifications of existing currency-handling devices that were originally designed to dispense cash only. In addition, gaming vouchers are dispensed and redeemed only once and are then discarded, which is wasteful and creates a disposal or recycling cost. Finally, many gaming patrons prefer a cash-substitute that looks more like cash than the typical gaming voucher, which more closely resembles a receipt.

Accordingly, there is a need for an improved cash-substitute that addresses the deficiencies of the prior art.

SUMMARY OF THE INVENTION

According to one embodiment, the present invention comprises a method comprising loading a plurality of gaming scrips into a currency-handling device, each of the plurality of gaming scrips having a pre-printed face value and a machine-readable identifier located thereon; dispensing a set of gaming scrips of the plurality of gaming scrips from the currency-handling device in response to a transaction initiated by a user of the currency-handling device; and activating each gaming scrip in the set of gaming scrips only after the dispensing step has been initiated.

According to another embodiment, the present invention comprises a set of instruments intended for use in a commercial establishment and having a cash value within that commercial establishment, the set of instruments comprising a face value that is printed on each instrument of the set of instruments; and a machine-readable identifier located on each instrument of the set of instruments, the machine-readable identifier being unique among the set of instruments.

According to another embodiment, the present invention comprises a method comprising positioning a first set of currency-handling devices on a gaming floor of a gaming establishment, the first set of currency-handling devices comprising at least one currency-handling device; positioning a second set of currency-handling devices on the property of the gaming establishment and outside the gaming floor, the second set of currency-handling devices comprising at least one currency-handling device; loading a plurality of gaming scrips into each of the at least one currency-handling device of both the first and second sets of currency-handling devices, each of the plurality of gaming scrips having a pre-printed face value and a machine-readable identifier located thereon; and loading cash into each of the at least one currency-handling device of only the second sets of currency-handling devices.

According to another embodiment, the present invention comprises a system comprising a plurality of gaming scrips, each of the plurality of gaming scrips having a pre-printed face value and a machine-readable identifier located thereon, the machine-readable identifier being unique among the plurality of gaming scrips; a server that is programmed to maintain a database of the machine-readable identifiers; at least one currency-handling device; and a network that enables the server to communicate with the at least one currency-handling device; wherein the server is programmed, in response to a communication from the at least one currency-handling device, to validate each gaming scrip of the plurality of gaming scrips, activate each gaming scrip of the plurality of gaming scrips at only the pre-printed face value of that gaming scrip, deactivate each gaming scrip of the plurality of gaming scrips and reactivate each gaming scrip of the plurality of gaming scrips at the pre-printed face value of that gaming scrip.

According to another embodiment, the present invention comprises an ATM comprising a cassette that is configured to be loaded with paper instruments; a user interface that is configured to enable a user to execute a withdrawal transaction from a bank account and/or a credit card account in an amount selected by the user in which one or more paper instruments are dispensed having a total face value equal to the selected amount; a pulling mechanism for removing the paper instruments one at a time from the cassette and transporting the paper instruments to a stack; a transport mechanism for moving the paper instruments from a stack to an exit slot; a reader that is configured to read a machine-readable identifier on each of the paper instruments as each of the paper instruments is being transported to the stack or while the paper instruments are arranged in the stack.

DETAILED DESCRIPTION OF THE DRAWINGS

The foregoing summary, as well as the following detailed description of the invention, will be better understood when read in conjunction with the appended drawings. For the purpose of illustrating the invention, there are shown in the drawings certain embodiments of the present invention. It should be understood, however, that the invention is not limited to the precise arrangements and instrumentalities shown. In the drawings, the same reference numerals are employed for designating the same elements throughout the several figures. In the drawings:

FIGS. 2A and 2B show examples of gaming scrip;

FIGS. 3A, 3B and 3C are flow charts illustrating exemplary methods of activating and dispensing gaming scrip;

FIG. 4 is a flow chart illustrating an exemplary automated teller machine ("ATM") transaction in which the user is given an option to receive gaming scrip or cash;

FIGS. 5A and 5B are schematic drawings illustrating exemplary arrangements of components in the dispensing path of an ATM configured to dispense gaming scrip;

FIG. 6 is a schematic drawing an exemplary arrangement of devices that dispense gaming scrip and devices that dispense cash.

DETAILED DESCRIPTION OF EXEMPLARY EMBODIMENTS

Figure 1:
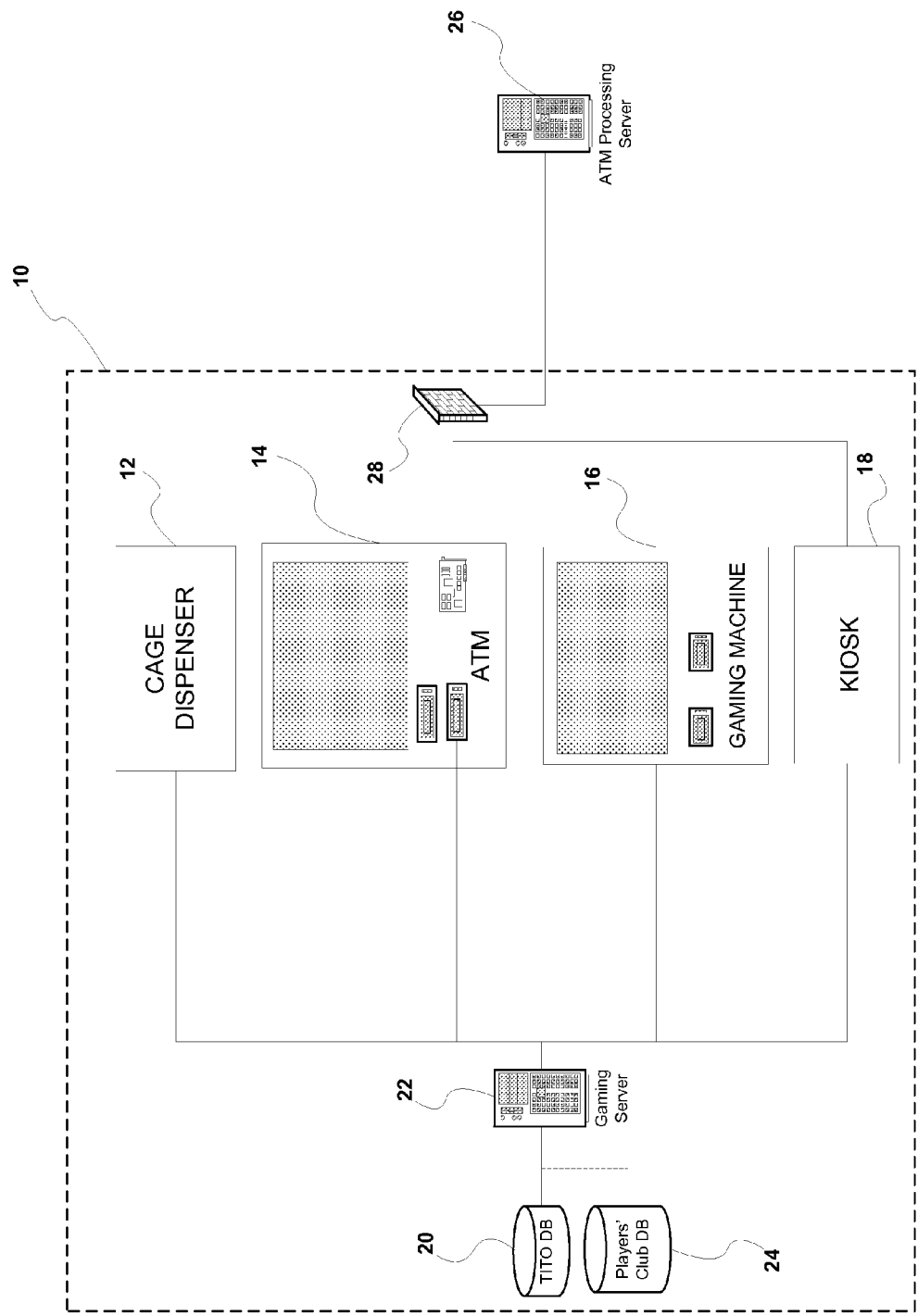
FIG. 1 is a schematic drawing showing the relationships between components of an exemplary system that will dispense and/or accept gaming scrip.

In describing the embodiments of the invention illustrated in the drawings, specific terminology will be used for the sake of clarity. However, the invention is not intended to be limited to the specific terms so selected, it being understood that each specific term includes all technical equivalents operating in similar manner to accomplish similar purpose. It is understood that the drawings are not drawn exactly to scale The following describes particular embodiments of the present invention. It should be understood, however, that the invention is not limited to the embodiments detailed herein. The present invention may be incorporated into existing machines or, alternatively, the system may be incorporated into newly manufactured machines.

Referring now to the drawings, an exemplary embodiment of a system 10 includes a cage dispenser 12, an ATM 14, a gaming machine 16 (such as a slot machine or video poker machine, for example), and a kiosk 18 (hereinafter referred to collectively as "currency-handling devices"). The currency-handling devices are connected to a gaming server 22, which is in turn connected to a ticket-in, ticket-out database 20 and optionally a Players' Club database 24, which may store, e.g., personal, playing, and "comp" information about individual patrons. The ATM 14 is connected to an off-site ATM Processing Server 26, the connection between which is protected via a firewall 28. In accordance with the present invention, each of the currency-handling devices is configured to dispense paper tickets having fixed and pre-printed face value denominations and a pre-printed unique identifier (hereinafter referred to as "gaming scrip") and may optionally be configured to dispense conventional gaming vouchers and/or cash.

Each piece of gaming scrip preferably has the following characteristics:
- a fixed value that is preferably displayed on its face and printed thereon prior to being loaded into a currency-handling device;
- it can be used in gaming machines, and preferably at gaming tables, within a particular casino environment like cash and vouchers, and can be redeemed for cash;
- it preferably has identical dimensions and thickness as the legal tender of the location of the gaming environment (such as a Federal Reserve Note in a gaming environment located in the United States), so that it could be dispensed using the existing devices that were originally designed to dispense legal tender;
- it includes a machine-readable unique identifier that is preferably readable using bar-code reading devices used for conventional gaming vouchers and which are compatible with existing "ticket-in, ticket out" voucher systems; and
- the identifier preferably also identifies the face value of the gaming scrip.

In addition to the characteristics noted above, gaming scrip having face values within the range of face values of the currency in circulation in the country or jurisdiction in which the gaming environment is located are preferably provided with face values that correspond to face values of currency in circulation in that jurisdiction. In this application, the terms "face value" and "denomination" are used interchangeably and are intended to have the same meaning. Optionally, gaming scrip could be provided in face values that are different from or greater than any of the face values of any currency in that jurisdiction. For example, gaming scrip to be provided in a gaming environment located in the United States could be provided having face values of $5, $10, $20, $250, $100 and $1,000.

Exemplary designs of gaming scrip 30, 36 are shown in FIGS. 2A & 2B. In FIG. 2A, a conventional bar code 32 is provided as the unique identifier. Alternatively, any suitable type of machine-readable unique identifier could be used. For example, the unique identifier could be incorporated into a gaming- or currency-related image, such as the dice 38 shown in FIG. 2B or an image of the building in which the casino is housed, for example. Alternatively, any other type of machine-readable identifier could be used, such as a radio frequency identification ("RFID"), for example. In FIG. 2A, for example, the gaming scrip 30 has a face value 34 equal to $20 USD. In this embodiment, the gaming scrip 30 may also include a facing marking 35, which will assist the currency-processing equipment to properly face and orient the pieces of gaming scrip 30, as substantially described below and shown in FIG. 7.

The gaming scrip 30 preferably is adapted to be validated using an existing system and database that manages gaming vouchers (often called TITO, which is short for ticket-in, ticket-out). An exemplary TITO database 20 is illustrated in FIG. 1.

Figures 3A, 3B:
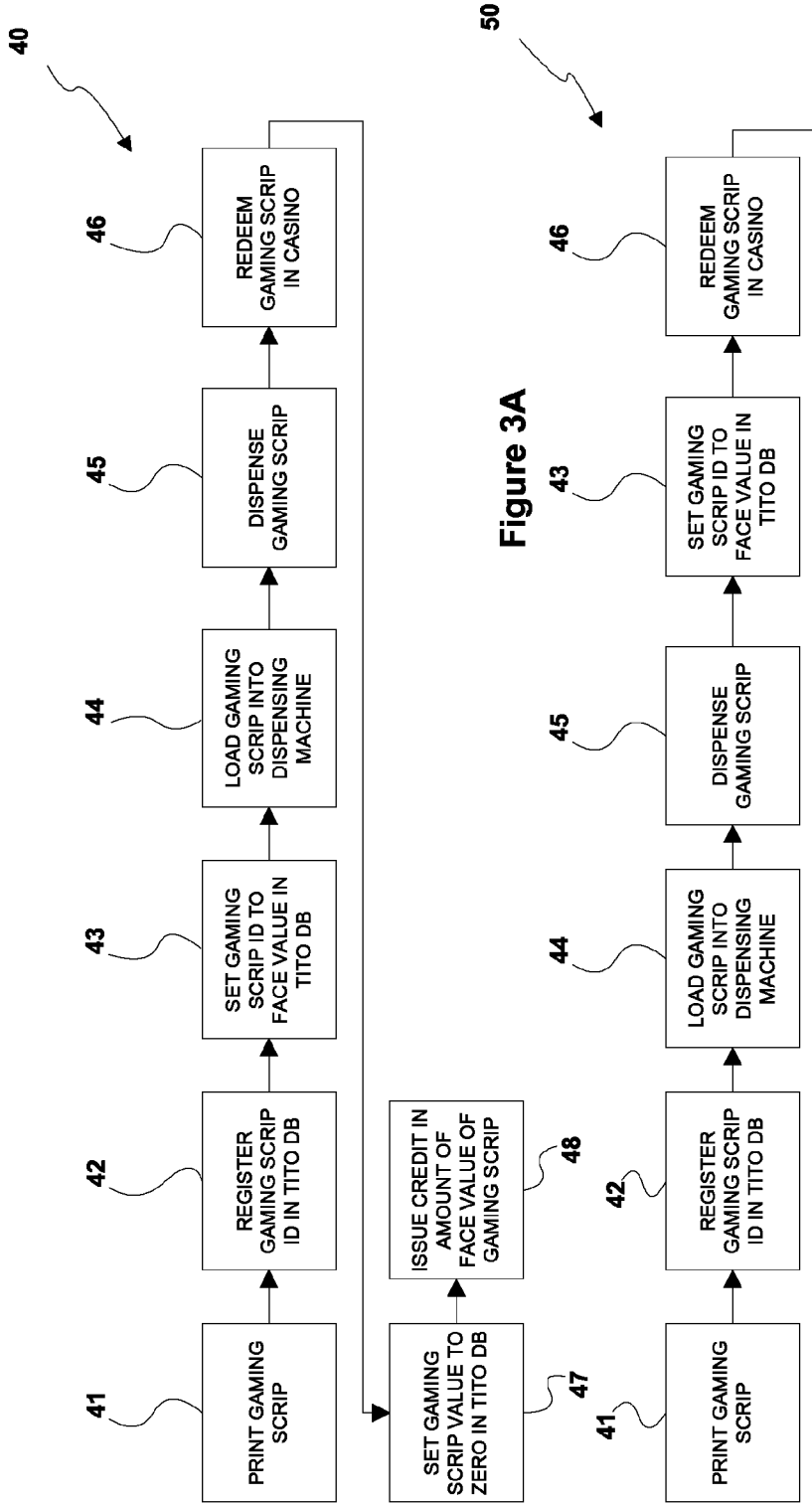

An exemplary method 40 of using gaming scrip 30 in a currency-dispensing device is shown in FIG. 3A. In this exemplary method 40, the gaming scrip 30 is pre-printed, preferably with a visible face value 34 and machine-readable unique identifier at step 41. The unique identifier for the gaming scrip 30 is then registered in the TITO database 20 at step 42 and "activated" in the TITO database 20 at step 43 by assigning a value to the gaming scrip 30 equal to the face value 34 of the gaming scrip 30. The gaming scrip 30 is then loaded into a dispensing machine, such as an ATM 14, at step 44. A patron then executes a transaction on the dispensing machine in which gaming scrip 30 is dispensed at step 45. The patron then redeems the gaming scrip 30 within the casino, by inserting the gaming scrip 30 into the bill validator of a gaming machine 16, for example, at step 46. Upon being validated, the value of the gaming scrip 30 is then "deactivated" or "cancelled" by setting its value to zero in the TITO database 20 at step 47 and the patron is issued a credit or cash equal to the amount of the face value 34 of the gaming scrip 30 at step 48. After the deactivated piece of gaming scrip 30 has been collected by the casino, that piece of gaming scrip 30 may be reactivated and reloaded into a dispensing machine or, in accordance with the methods discussed below, reloaded into a dispensing machine for later reactivation once the gaming scrip 30 has been re-dispensed from a dispensing machine.

The exemplary method 50 shown in FIG. 3B is identical to the method 40 shown in FIG. 3A, except that the value of the gaming scrip 30 is not set to its face value 34 (at step 43) until after it is loaded into the dispensing machine at step 44 and dispensed from the dispensing machine at step 45. A more specific example of this method 50 is also shown in FIG. 4, which is an example of an ATM transaction 65, beginning at step 66, in which the patron is given the option at step 67 to receive gaming scrip 30 or cash. If the patron chooses to receive gaming scrip 30, the gaming scrip is dispensed at step 45, the unique identifier of each piece of gaming scrip 30 is read at step 68, and optionally the gaming scrip 30 is set to its face value 34 in the TITO database 20 at step 43, before the ATM transaction 65 is ended at step 70. If, at step 67, the patron chooses to not dispense gaming scrip 30, the ATM transaction 65 progresses to step 69, where cash is dispensed before the transaction is ended at step 70. By way of a more specific example, a patron seeking to receive $200 worth of gaming scrip would be dispensed ten $20 face value pieces of gaming scrip or two $100 face value pieces of gaming scrip.

Another method 60 of using gaming scrip in a currency-dispensing device is shown in FIG. 3C. This exemplary method is also identical to the exemplary methods 40, 50 shown in FIGS. 3A and 3B, except for the manner in which the gaming scrip 30 is validated. In this example, gaming scrip 30 is pulled and collected in a stack at step 61. At step 62, the unique identifier (ID) 32 of each of the pieces of gaming scrip 30 in the stack is read. If, at step 63, all of the IDs are found to be readable and valid, the method 60 proceeds to step 43. If, at step 63, any of the identifiers cannot be read or cannot be validated, the pulled pieces of gaming scrip 30 are discarded at step 64, and the method 60 returns to step 61 and a new stack of gaming scrip 30 is pulled.

Referring now to FIG. 5A, one way of enabling the methods shown in FIGS. 3A-4 would be to add a bar code reader 72 in the dispensing path 73 of a dispensing machine (such as an ATM 14) between a cassette 74 containing the pieces of gaming scrip 30 and an exit slot 75. In this embodiment, the cassette 74 has been pre-loaded with pieces of the gaming scrip 30. The cassette may be identical to a cassette that would be used to load cash into the currency-handling device. This reduces the likelihood of fraudulent use of gaming scrip 30 (such as counterfeiting) because the gaming scrip 30 would have no value until dispensed. The bar code reader is preferably connected to a gaming server 22 within the system 10 (see FIG. 1), so that the value of the gaming scrip 30 is set to its face value 34 in the TITO database 20 when the bar code 32 on the gaming scrip 30 is read by the bar code reader 72 in the dispensing path 73. In other words, the gaming server 22 is programmed to maintain a database of the machine-readable identifiers of the gaming scrips 30. The gaming server 22 is connected to and communicated with the currency-handling devices via a network. A similar configuration could be used for dispensing machines used by gaming employees within the casino cage, i.e. cage dispenser 12. Drawers for dispensing gaming scrip 30 could include bar code readers in the dispensing path. In the case of gaming scrip 30 using RFID as identifiers, as shown in FIG. 5B, an RFID reader 76 could be placed in close proximity to the stack 77 of gaming scrip 30. The dispensing mechanism 71 within the ATM 14 could include a picking mechanism 78 that picks the pieces of gaming scrip from the cassette 74 and a transport mechanism 79 that moves the pieces of gaming scrip 30 to the exit slot 75.

An exemplary arrangement of dispensing machines on a gaming floor 82 is shown in FIG. 6. In this example, the dispensing machines include cage dispenser 12, kiosk 18, and ATM 14, and are configured to dispense only gaming scrip 30 (and optionally vouchers). Dispensing machines configured to dispense cash, for example cash-dispensing ATM 83 and cash-dispensing kiosk 84 (and optionally gaming scrip 30) are positioned in locations outside the gaming floor 82. Limiting the availability of cash on the gaming floor and making gaming scrip widely available increases the likelihood that a gaming patron will use funds withdrawn on the gaming floor for gaming activities.

Most gaming environments presently use bulk currency-sorting equipment to sort cash and vouchers that have been inserted into the currency-handling devices in the gaming environment and have become commingled, and to prepare cash for recirculation. Examples of bulk processing equipment include the De La Rue model CPS/DLR7000 and the Shinwoo model SB-1000+. Existing bulk currency-sorting equipment has the capability to separate cash from vouchers, read and generate a list of the bar codes of the vouchers, shred the vouchers, "face" (orient the notes face up) cash, "orient" (change the orientation, as necessary, to be uniform) cash, group cash by denomination, and strap cash in bundles having predetermined total values.

Figure 7:
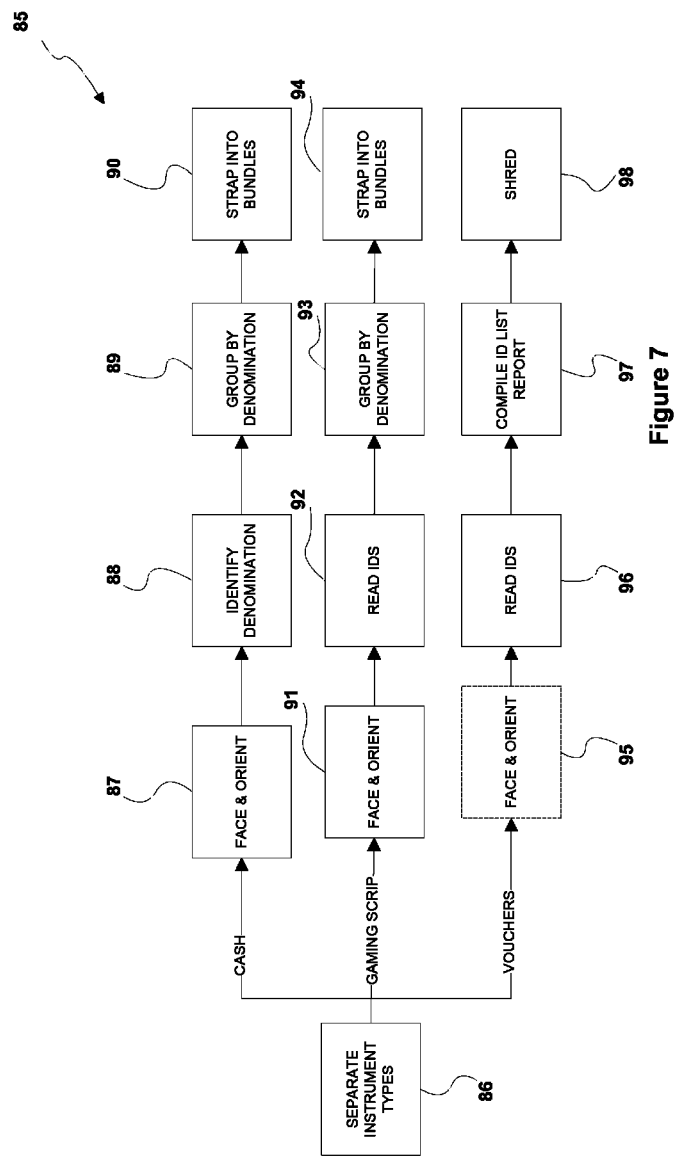
FIG. 7 is a flow chart illustrating an exemplary method of sorting cash, gaming scrip and vouchers gathered from gaming machines.

FIG. 7 illustrates an exemplary method 85 of bulk processing of co-mingled cash, gaming scrip 30 and vouchers (collectively referred to hereinafter as "instruments"). The first step in the process is to separate each type of instrument at step 86. This can be accomplished either in a single step (in which three output collection areas are provided) or in two steps, comprising a first step in which one type of instrument is directed to one output collection area and the other two types of instruments are directed to a second output collection area and a second step in which the first step is repeated on the instruments directed to the second output collection area. The two-step separation process is preferred when existing bulk currency sorting equipment, which often has only two output collection areas, is used.

After being separated, the processing of cash and vouchers proceeds in a conventional manner. For example, the cash is faced and oriented at step 87, the denomination of the bills are identified at step 88, the bills are grouped by denomination at step 89, and the cash is bundled at step 90. The vouchers are optionally faced and oriented at step 95, the identifiers of the vouchers are read at step 96, a list of identifiers are compiled into a report at step 97, and the vouchers are shredded or otherwise destroyed at step 98. Further processing of gaming scrip 30 preferably includes facing and orienting the gaming scrip at step 91 and reading the unique identifier of each piece of gaming scrip 30 at step 92. As explained above, it is preferable that the identifier on each piece of gaming scrip 30 be coded to identify the denomination of that piece of gaming scrip 30 and that the bulk currency sorting equipment be programmed to recognize the denomination from the identifier. This enables the bulk currency sorting equipment to determine the denomination of each piece of gaming scrip 30 without accessing the TITO database 20, which would significantly reduce processing efficiency. Alternatively, the bulk currency sorting equipment could be programmed to recognize the face value 34 of a piece of gaming scrip 30 by scanning the front of the gaming scrip 30 and recognizing the face value 34 printed on the gaming scrip 30. The gaming scrip 30 is then grouped by denomination at step 93 and is optionally strapped at step 94. At the conclusion of this process, the gaming scrip is ready to be recirculated.

It will be appreciated by those skilled in the art that changes can be made to the embodiments described above without departing from the broad inventive concept thereof. It is understood, therefore, that this invention is not limited to the particular embodiments enclosed, but is intended to cover modifications within the sphere and scope of the present invention.

The invention claimed is:

1. A system comprising:
a plurality of gaming devices;
a server configured to communicate with the gaming devices; and
a first non-gaming currency-handling kiosk device configured to communicate with the server, wherein:
the first non-gaming currency-handling kiosk device is configured (i) to be loaded with a plurality of pre-activated scrips, each pre-activated scrip having a pre-printed face value, a pre-activated gaming value of zero, and a pre-configured identifier, and (ii) to properly dispense scrips to gaming-machine users;

each gaming device is configured to read the pre-configured identifier of a scrip, transmit information about the pre-configured identifier to the server, and receive from the server information about a gaming value for the scrip, wherein:
the gaming value of the scrip is either zero or the pre-printed face value of the scrip;
when the gaming value of the scrip is equal to the pre-printed face value of the scrip, the gaming device credits the gaming-machine user based on the pre-printed face value of the scrip; and
when the gaming value of the scrip is equal to zero, the gaming device does not credit the gaming-machine user based on the pre-printed face value of the scrip;

the server is configured to maintain a scrip database that identifies activated scrips and maps the pre-configured identifier of each activated scrip to the pre-printed face value of the activated scrip;

after a scrip is loaded into the first non-gaming currency-handling kiosk device, but prior to the scrip being properly dispensed from the first non-gaming currency-handling kiosk device, the scrip database does not identify the scrip as an activated scrip such that, when a gaming device reads the pre-configured identifier of a scrip that was improperly removed from the first non-gaming currency-handling kiosk device, the information received by the gaming device from the server indicates that the gaming value of the scrip is zero; and when a scrip is properly dispensed from the first non-gaming currency-handling kiosk device, the first non-gaming currency-handing kiosk device transmits information about the pre-configured identifier of the scrip to the server and the server updates the scrip database to identify the scrip as an activated scrip.

2. The system of claim 1, wherein the plurality of scrips comprises:
a first set of scrips having a first pre-printed face value; and
a second set of scrips having a second pre-printed face value different from the first pre-printed face value.

3. The system of claim 2, wherein:
the system is located in a jurisdiction having currency in a finite set of different denominations; and
the plurality of scrips consists of scrips having pre-printed face values corresponding to the finite set of different denominations or a subset thereof.

4. The system of claim 1, wherein the first non-gaming currency-handling kiosk device is configured to dispense two or more scrips to an individual gaming-machine user in a single transaction, wherein the two or more scrips have a total value corresponding to a value of the single transaction.

5. The system of claim 1, wherein the first non-gaming currency-handling kiosk device is configured to read the pre-configured identifier of an activated scrip of a user and dispense cash to the user have a value equal to the pre-printed face value of the activated scrip.

6. The system of claim 5, wherein:
the first non-gaming currency-handling kiosk device transmits information about the pre-configured identifier to the server and receives confirmation from the server about the pre-printed face value of the activated scrip.

7. The system of claim 1, wherein:
the first non-gaming currency-handling kiosk device and the plurality of gaming devices are positioned on a gaming floor of a gaming establishment; and
the system further comprises a second non-gaming currency-handling kiosk device positioned outside the gaming floor, wherein:
the second non-gaming currency-handling kiosk device is configured to read the pre-configured identifier of an activated scrip of a user and dispense cash to the user have a value equal to the pre-printed face value of the activated scrip; and
the first non-gaming currency-handling kiosk device is not configured to dispense cash to a user.

8. The system of claim 1, wherein the first non-gaming currency-handling kiosk device is one of a kiosk, an ATM, and a cage dispenser.

9. The system of claim 1, wherein:
the system is a retrofitted system;
prior to being retrofitted, the system was an existing system comprising an existing non-gaming currency-handling kiosk device designed to dispense cash only; and
retrofitting the original system comprised modifying the existing non-gaming currency-handling kiosk device to properly dispense scrips.

10. The system of claim 9, wherein the existing non-gaming currency-handling kiosk device was modified by adding a reader in a dispensing path between a cassette for containing pieces of the scrip and an exit slot.

11. The system of claim 1, wherein, after the server transmits the information about the gaming value for the scrip, the server updates the scrip database to no longer identify the scrip as an activated scrip, such that, when a gaming device reads the pre-configured identifier of the scrip, the information received by the gaming device from the server indicates that the gaming value of the scrip is zero.

12. The system of claim 11, wherein, when the scrip is subsequently properly dispensed from the non-gaming currency-handling kiosk device, the server updates the scrip database to again identify the scrip as an activated scrip.

13. The system of claim 1, wherein the pre-configured identifier is a unique bar code within the system.

14. The system of claim 1, wherein the gaming device is a gaming machine or a gaming table in a casino environment.

15. The system of claim 14, wherein the gaming device is a slot machine or video poker machine.

16. A first non-gaming currency-handling kiosk device for a system comprising:
a plurality of gaming devices;
a server configured to communicate with the gaming devices; and
the first non-gaming currency-handling kiosk device configured to communicate with the server, wherein:
the first non-gaming currency-handling kiosk device is configured (i) to be loaded with a plurality of pre-activated scrips, each pre-activated scrip having a pre-printed face value, a pre-activated gaming value of zero, and a pre-configured identifier, and (ii) to properly dispense scrips to gaming-machine users;
each gaming device is configured to read the pre-configured identifier of a scrip, transmit information about the pre-configured identifier to the server, and receive from the server information about a gaming value for the scrip, wherein:
the gaming value of the scrip is either zero or the pre-printed face value of the scrip;

when the gaming value of the scrip is equal to the pre-printed face value of the scrip, the gaming device credits the gaming-machine user based on the pre-printed face value of the scrip; and when the gaming value of the scrip is equal to zero, the gaming device does not credit the gaming-machine user based on the pre-printed face value of the scrip;

the server is configured to maintain a scrip database that identifies activated scrips and maps the pre-configured identifier of each activated scrip to the pre-printed face value of the activated scrip;

after a scrip is loaded into the first non-gaming currency-handling kiosk device, but prior to the scrip being properly dispensed from the first non-gaming currency-handling kiosk device, the scrip database does not identify the scrip as an activated scrip such that, when a gaming device reads the pre-configured identifier of a scrip that was improperly removed from the first non-gaming currency-handling kiosk device, the information received by the gaming device from the server indicates that the gaming value of the scrip is zero; and when a scrip is properly dispensed from the first non-gaming currency-handling kiosk device, the first non-gaming currency-handing device transmits information about the pre-configured identifier of the scrip to the server and the server updates the scrip database to identify the scrip as an activated scrip.

17. The kiosk device of claim 16, wherein the non-gaming currency-handling kiosk device comprises:
a cassette configured to be loaded with the scrips;
a reader configured to read the pre-configured identifier of a scrip; and
a network connection configured to communicate information about the pre-configured identifier to the server.

18. The kiosk device of claim 17, wherein the reader is a bar code reader or an RFID reader.

19. The kiosk device of claim 18, wherein the non-gaming currency-handling kiosk device further comprises:
a user interface configured to enable a user to execute a withdrawal transaction from a bank account or credit card account in an amount selected by the user in which two or more scrips are dispensed having a total face value equal to the selected amount.

20. The kiosk device of claim 18, wherein the non-gaming currency-handling kiosk device further comprises:
a pulling mechanism configured to remove the scrips one at a time from the cassette and transporting the scrips to a stack; and
a transport mechanism configured to move the scrips from the stack to an exit slot.

21. A server for a system comprising:
a plurality of gaming devices;
a server configured to communicate with the gaming devices; and
a first non-gaming currency-handling kiosk device configured to communicate with the server, wherein:
the first non-gaming currency-handling kiosk device is configured (i) to be loaded with a plurality of pre-activated scrips, each pre-activated scrip having a pre-printed face value, a pre-activated gaming value of zero, and a pre-configured identifier, and (ii) to properly dispense scrips to gaming-machine users;
each gaming device is configured to read the pre-configured identifier of a scrip, transmit information about the pre-configured identifier to the server, and receive from the server information about a gaming value for the scrip, wherein:
the gaming value of the scrip is either zero or the pre-printed face value of the scrip;
when the gaming value of the scrip is equal to the pre-printed face value of the scrip, the gaming device credits the gaming-machine user based on the pre-printed face value of the scrip; and
when the gaming value of the scrip is equal to zero, the gaming device does not credit the gaming-machine user based on the pre-printed face value of the scrip;

the server is configured to maintain a scrip database that identifies activated scrips and maps the pre-configured identifier of each activated scrip to the pre-printed face value of the activated scrip;

after a scrip is loaded into the first non-gaming currency-handling kiosk device, but prior to the scrip being properly dispensed from the first non-gaming currency-handling kiosk device, the scrip database does not identify the scrip as an activated scrip such that, when a gaming device reads the pre-configured identifier of a scrip that was improperly removed from the first non-gaming currency-handling kiosk device, the information received by the gaming device from the server indicates that the gaming value of the scrip is zero; and when a scrip is properly dispensed from the first non-gaming currency-handling kiosk device, the first non-gaming currency-handing device transmits information about the pre-configured identifier of the scrip to the server and the server updates the scrip database to identify the scrip as an activated scrip.

22. A gaming device for a system comprising:
a plurality of gaming devices;
a server configured to communicate with the gaming devices; and
a first non-gaming currency-handling kiosk device configured to communicate with the server, wherein:
the first non-gaming currency-handling kiosk device is configured (i) to be loaded with a plurality of pre-activated scrips, each pre-activated scrip having a pre-printed face value, a pre-activated gaming value of zero, and a pre-configured identifier, and (ii) to properly dispense scrips to gaming-machine users;
each gaming device is configured to read the pre-configured identifier of a scrip, transmit information about the pre-configured identifier to the server, and receive from the server information about a gaming value for the scrip, wherein:
the gaming value of the scrip is either zero or the pre-printed face value of the scrip;
when the gaming value of the scrip is equal to the pre-printed face value of the scrip, the gaming device credits the gaming-machine user based on the pre-printed face value of the scrip; and
when the gaming value of the scrip is equal to zero, the gaming device does not credit the gaming-machine user based on the pre-printed face value of the scrip;

the server is configured to maintain a scrip database that identifies activated scrips and maps the pre-configured identifier of each activated scrip to the pre-printed face value of the activated scrip;

after a scrip is loaded into the first non-gaming currency-handling kiosk device, but prior to the scrip being properly dispensed from the first non-gaming currency-handling kiosk device, the scrip database does not identify the scrip as an activated scrip such that, when a gaming device reads the pre-configured identifier of a scrip that was improperly removed from the first non-gaming currency-handling kiosk device, the information received by the gaming device from the server indicates that the gaming value of the scrip is zero; and when a scrip is properly dispensed from the first non-gaming currency-handling kiosk device, the first non-gaming currency-handing device transmits information about the pre-configured identifier of the scrip to the server and the server updates the scrip database to identify the scrip as an activated scrip.

23. A method for retrofitting an existing system comprising a plurality of gaming devices, a server configured to communicate with the gaming devices and an existing non-gaming currency-handling kiosk device configured to communicate with the server, wherein the method comprises:

modifying the existing non-gaming currency-handling kiosk device to be a first non-gaming currency-handling kiosk device that properly dispenses scrips, such that:

the first non-gaming currency-handling kiosk device is configured (i) to be loaded with a plurality of pre-activated scrips, each pre-activated scrip having a pre-printed face value, a pre-activated gaming value of zero, and a pre-configured identifier, and (ii) to properly dispense scrips to gaming-machine users;

each gaming device is configured to read the pre-configured identifier of a scrip, transmit information about the pre-configured identifier to the server, and receive from the server information about a gaming value for the scrip, wherein:

the gaming value of the scrip is either zero or the pre-printed face value of the scrip;

when the gaming value of the scrip is equal to the pre-printed face value of the scrip, the gaming device credits the gaming-machine user based on the pre-printed face value of the scrip; and when the gaming value of the scrip is equal to zero, the gaming device does not credit the gaming-machine user based on the pre-printed face value of the scrip;

the server is configured to maintain a scrip database that identifies activated scrips and maps the pre-configured identifier of each activated scrip to the pre-printed face value of the activated scrip;

after a scrip is loaded into the first non-gaming currency-handling kiosk device, but prior to the scrip being properly dispensed from the first non-gaming currency-handling kiosk device, the scrip database does not identify the scrip as an activated scrip such that, when a gaming device reads the pre-configured identifier of a scrip that was improperly removed from the first non-gaming currency-handling kiosk device, the information received by the gaming device from the server indicates that the gaming value of the scrip is zero; and when a scrip is properly dispensed from the first non-gaming currency-handling kiosk device, the first non-gaming currency-handing device transmits information about the pre-configured identifier of the scrip to the server and the server updates the scrip database to identify the scrip as an activated scrip.

24. The method of claim 23, wherein the existing non-gaming currency-handling device was designed to dispense cash only.

25. The method of claim 23, wherein each scrip has the we-printed face value and the we-configured identifier when it is loaded into the first non-gaming currency-handling device.

26. The system of claim 1, wherein each scrip has the we-printed face value and the we-configured identifier when it is loaded into the first non-gaming currency-handling device.

27. The kiosk device of claim 16, wherein each scrip has the we-printed face value and the we-configured identifier when it is loaded into the first non-gaming currency-handling device.

28. The server of claim 21, wherein each scrip has the we-printed face value and the we-configured identifier when it is loaded into the first non-gaming currency-handling device.

29. The gaming device of claim 22, wherein each scrip has the we-printed face value and the we-configured identifier when it is loaded into the first non-gaming currency-handling device.

* * * * *